United States Patent
Li et al.

(10) Patent No.: US 7,911,474 B2
(45) Date of Patent: Mar. 22, 2011

(54) MEMORY MANAGEMENT SYSTEM AND METHOD FOR GPU-BASED VOLUME RENDERING

(75) Inventors: Wei Li, Princeton, NJ (US); Gianluca Paladini, Skillman, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 526 days.

(21) Appl. No.: 11/679,990

(22) Filed: Feb. 28, 2007

(65) Prior Publication Data

US 2007/0229521 A1    Oct. 4, 2007

Related U.S. Application Data

(60) Provisional application No. 60/788,815, filed on Apr. 3, 2006.

(51) Int. Cl.
*G06F 13/00* (2006.01)
(52) U.S. Cl. ........ 345/538; 345/419; 345/536; 345/537; 345/543; 345/557
(58) Field of Classification Search .................. 345/424, 345/557
See application file for complete search history.

(56) References Cited

U.S. PATENT DOCUMENTS

| | | | |
|---|---|---|---|
| 5,864,342 A * | 1/1999 | Kajiya et al. | 345/418 |
| 6,330,649 B1 * | 12/2001 | Frank et al. | 711/163 |
| 6,556,200 B1 * | 4/2003 | Pfister et al. | 345/426 |
| 7,673,304 B2 * | 3/2010 | Gosalia et al. | 718/102 |
| 2002/0181663 A1 | 12/2002 | Paladini | |
| 2004/0181151 A1 | 9/2004 | Sumanaweera et al. | |
| 2005/0213837 A1 | 9/2005 | Boykov et al. | |
| 2005/0231503 A1 | 10/2005 | Heng et al. | |
| 2006/0123215 A1 | 6/2006 | Paladini et al. | |

OTHER PUBLICATIONS

D. DeMarle, S. Parker, M. Hartner, C. Gribble, C. Hansen, "Distributed Interactive Ray Tracing for Large Volume Visualization", Oct. 21, 2003, IEEE Symposium on Parallel and Large-Data Visualization and Graphics 2003, pp. 87-94.*
S. Parker, M. Parker, Y. Livnat, P.P. Sloan, C. Hansen, P. Shirley, "Interactive Ray Tracing for Volume Visualization", Sep. 1999, IEEE Transaction On Visualization and Computer Graphics, vol. 5, No. 3.*
John Plate, Michael Tirtasana, Rhadames Carmona, Bernd Frohlich, "Octreemizer: A Hierarchical Approach for Interactive Roaming Through Very Large Volumes", 2002, The Eurographics Association, Joint EUROGRAPHICS—IEEE TCVG Symposium on Visualization (2002).*
Pei Cao, Sandy Irani, "Cost-Aware WWW Proxy Caching Algorithms", Dec. 1997, Proceedings of the USENIX Symposium on Internet Technologies and Systems, pp. 1-15.*

* cited by examiner

*Primary Examiner* — Ulka Chauhan
*Assistant Examiner* — Robert Bader
(74) *Attorney, Agent, or Firm* — Donald B. Paschburg

(57) ABSTRACT

A memory manager interfaces between a rendering application and the driver controlling one or more memories. A multi-level brick cache system caches bricks in a memory hierarchy to accelerate the rendering. One example memory hierarchy may include system memory, AGP memory, and graphics memory. The memory manager allows control of brick overwriting based on current or past rendering. Since different memories are typically available, one or more memory managers may control storage of bricks into different memories to optimize rendering. Management of different memory levels, overwriting based on current or previous rendering, and an interfacing memory manager may each be used alone or in any possible combination.

25 Claims, 2 Drawing Sheets

MEMORY MANAGEMENT SYSTEM AND METHOD FOR GPU-BASED VOLUME RENDERING

RELATED APPLICATIONS

The present patent document claims the benefit of the filing date under 35 U.S.C. §119(e) of Provisional U.S. Patent Application Ser. No. 60/788,815, filed Apr. 3, 2006, which is hereby incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the memory Patent and Trademark Office patent file or records, but otherwise reserves all copyright rights whatsoever.

BACKGROUND

The present embodiments relate to memory management in volume rendering. In GPU- or texture-based volume rendering, a volume dataset is represented as one or more texture objects. The voxel values of the dataset are mapped to colors by texture operations and composited into the frame buffer. For typical viewing parameters in rendering, a large number of voxels are invisible or not needed. For example, the voxels may be insignificant due to a transfer function, view frustum, occlusion, or masking. Such voxels are loaded into memory, requiring time and memory space.

In the simplest case, a whole volume is treated as a single 3D texture. However, a volume dataset may be much larger than the available graphics memory.

The dataset may be partitioned or bricked. The bricking technique partitions a volume into smaller sub-volumes, each referred to as a brick. Only bricks containing visible voxels are loaded into graphics memory. Bricking may avoid some undesired memory transfers and allow visualization of datasets larger than texture memory.

During a volume visualization session, users usually modify viewing parameters to inspect different aspects of a dataset or imaged region. The bricks associated with visible voxels may change accordingly. Such changes may result in unneeded bricks being stored in the texture memory. Additional bricks may need to be transferred into memory, but sufficient memory space may be unavailable without overwriting needed cached bricks or storage in a less optimum memory. Transfer of bricks due to rendering changes may operate inefficiently, especially when the overall dataset is bigger than the texture memory capacity.

A driver controls storage of the bricks. Standard graphics APIs, such OpenGL, request needed data from a driver. A rendering application does not control where texture objects are stored. For example, in case of an out-of-memory condition, the driver for a graphics card may choose to swap some textures to system memory to satisfy new texture memory requests. The swapping may result in rendering delays.

BRIEF SUMMARY

By way of introduction, the preferred embodiments described below include methods, systems, instructions, and computer readable media for managing volume rendering memory. A memory manager interfaces between a rendering application and the driver controlling one or more memories. A multi-level brick cache system caches bricks in a memory hierarchy to accelerate the rendering. One example memory hierarchy may include system memory, AGP memory, and graphics memory. The memory manager allows control of brick overwriting based on current or past rendering. Since different memories are typically available, one or more memory managers may control storage of bricks into different memories to optimize rendering. Management of different memory levels, overwriting based on current or previous rendering, and an interfacing memory manager may each be used alone or in any possible combination.

In a first aspect, a computer readable storage medium has stored therein data representing instructions executable by a programmed processor for managing volume rendering memory. The storage medium has instructions for: volume rendering from a data set representing a three-dimensional volume; storing the data set as bricks; and managing, as a function of the volume rendering, the storage of the bricks with a brick cache manager.

In a second aspect, a system is provided for managing volume rendering memory. A graphics processing unit is operable for volume rendering. A memory is responsive to a driver. A processor is operable to manage storage of volume data partitioned into subsets, the processor interfacing between the driver and the volume rendering.

In a third aspect, a method is provided for managing volume rendering memory. Subsets of data representing a volume are cached in different physical memory levels. The caching in each of the different physical memory levels is managed.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

In GPU-based volume rendering, a dataset is partitioned into bricks for large datasets. A multi-level brick cache system caches bricks in a memory hierarchy to accelerate the rendering. One example memory hierarchy may include system memory, AGP memory, and graphics memory (e.g., memory levels). The brick cache system serves as a memory manager for rendering applications to more precisely control the usage of memory. Each cached brick is assigned a priority, and the priorities are updated according to the current rendering parameters. The brick cache system also serves as a manager of graphics memory that handles non-brick memory requests. The memory manager of the brick cache system interfaces with a separate driver, taking advantage of any future memory management APIs potentially provided by the driver of a graphics card.

Figure 1:
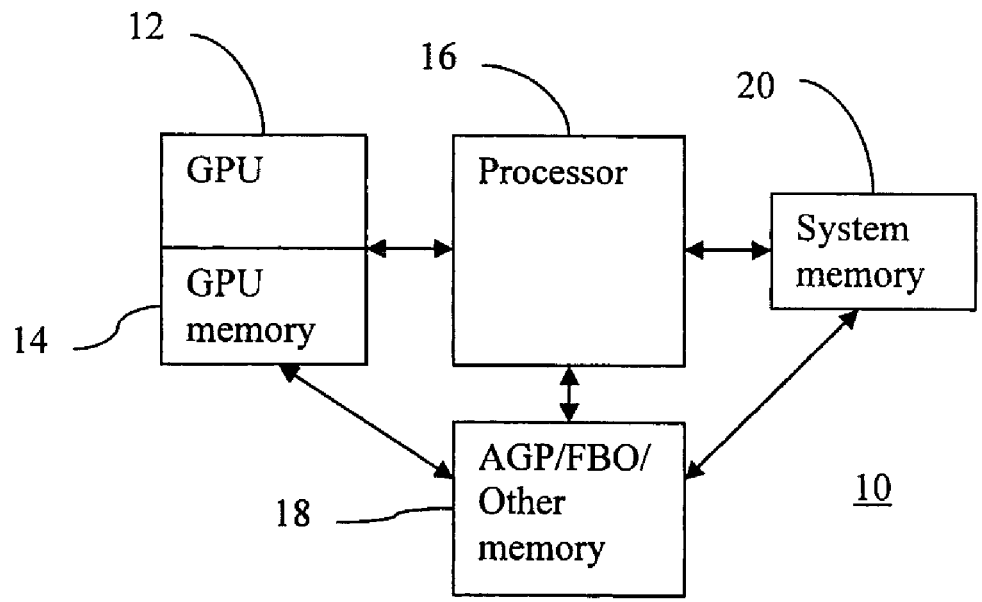
FIG. 1 is a block diagram of one embodiment of a system for managing volume rendering memory.

FIG. 1 shows a system 10 for managing volume rendering memory. The system 10 includes a graphics processing unit (GPU) 12, a GPU memory 14, a processor 16, an accelerated graphics port (AGP), a buffer of a frame buffer object, or other intermediate memory 18, and a system memory 20. Additional, different, or fewer components may be provided. For example, a hard drive, removable media, or other memory component is provided in addition to or as a replacement for the memories 14, 18, or 20 of the system 10. As another example, a user input, display, network, or network connection are provided, such as for networking with a medical imaging network or data archival system. In another example, the intermediate memory 18 is not provided, such as where the GPU 12 is on a motherboard of the processor 16 and has shared access to the system memory 20.

The system 10 is part of a medical imaging system, such as a diagnostic or therapy ultrasound, x-ray, computed tomography, magnetic resonance, positron emission, or other system. Alternatively, the system 10 is part of an archival and/or image processing system, such as associated with a medical records database workstation. In other embodiments, the system 10 is a personal computer, such as desktop or laptop.

The GPU 12 is a graphics accelerator chip, processor, application specific integrated circuit, analog circuit, digital circuit, accelerator card, or combinations thereof. In one embodiment, the GPU 12 is a personal computer graphics accelerator card or components, such as manufactured by nVidia (e.g. Quadro FX 4500 or others), ATI (e.g. Radeon 9700 or others), or Matrox (e.g. Parhelia or others). The GPU 12 provides hardware devices for accelerating volume rendering processes, such as using application programming interfaces for three-dimensional texture mapping. Example APIs include OpenGL and DirectX, but other APIs may be used independent of or with the GPU 12.

The GPU 12 is operable for volume rendering based on the API or an application controlling the API. The GPU 12 is operable to texture map with alpha blending, minimum projection, maximum projection, surface rendering, or other volume rendering of the data.

Any type of data may be used for volume rendering, such as medical image data (e.g., ultrasound, x-ray, computed tomography, magnetic resonance, or positron emission). The rendering is from data distributed in an evenly spaced three-dimensional grid, but may be from data in other formats (e.g., rendering from scan data free of conversion to a Cartesian coordinate format or scan data including data both in a Cartesian coordinate format and acquisition format).

The GPU memory 14 is a video random access memory, a random access memory, or other memory device for storing data or video information. In one embodiment, the GPU memory 14 is a video random access memory of the GPU 12. A driver for the GPU 12 or a memory driver controls storage of data by the GPU memory 14. The GPU memory 14 is responsive to the driver to store, transfer, and retrieve data. The GPU memory 14 is operable to store subsets or bricks of data.

The GPU 12 and/or the GPU memory 14 are included within the system 10 as part of a single system component, such as a medical diagnostic or therapy imaging system. In alternative embodiments, the GPU 12 and GPU memory 14 are provided separate from a data acquisition system, such as provided in a workstation or personal computer. The acquired data is transferred wirelessly, over a computer network, or through a transferable storage medium to the GPU 12.

The AGP memory 18 and system memory 20 are random access memories, cache memory of the processor 16, or other memory devices for storing data or video information. In one embodiment, the AGP memory 18 is a separately operated, addressed, or administered part of the system memory 20. Alternatively, the AGP memory 18 is a separate device than the system memory 20. Each memory 14, 18, 20 is a separate memory pool, such as any continuously addressed memory. Additional or alternative memories may be included, such as a hard drive, flash drive, optical, magnetic, or other now known or later developed memory.

The different memories 14, 18, and 20 provide multiple memory layers or levels. Each different memory 14, 18, and 20 may be associated with different characteristics for volume rendering. For example, volume rendering is performed more quickly using the GPU memory 14. The AGP memory 18 may allow for more rapid access for rendering than the system memory 20. By caching bricks for a current rendering in more rapidly accessible memories 14, 18, and 20, data transfers and delay may be avoided.

Figure 2:
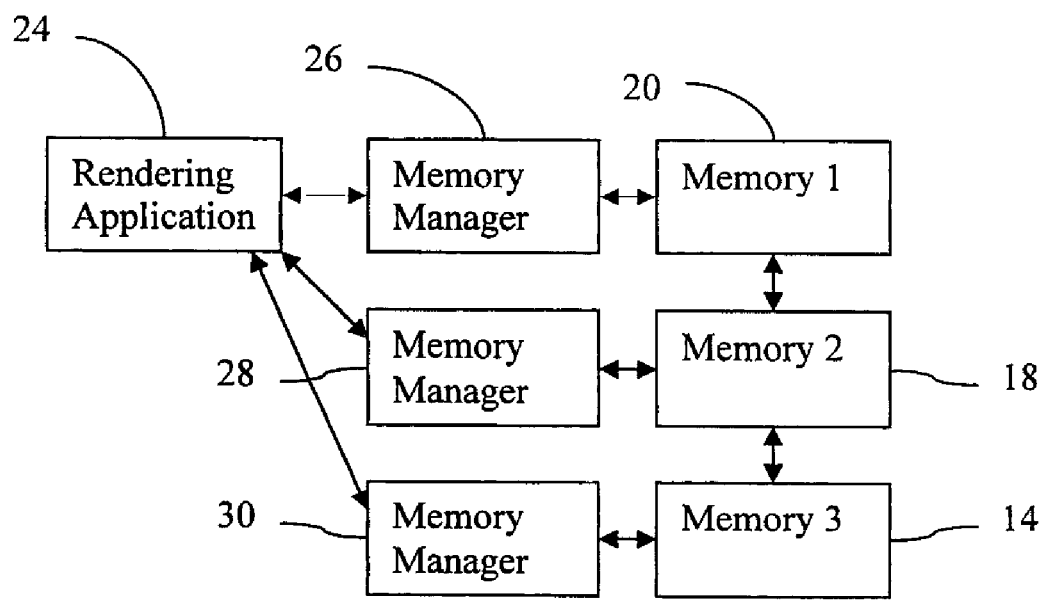
FIG. 2 is an exemplary representation of interfacing between a rendering application and available memories.

FIG. 2 shows the three memories 12, 18, 20, and a rendering application 24. One or more memory managers 26, 28, and 30 interface between the rendering application 24 and the memories 12, 18, 20 and any associated drivers. The rendering application 24 controls the levels of the memory managers 26, 28, and 30, while memory managers 26, 28, and 30 may or may not communicate with each other directly. Data may be transferred among different levels of brick caches. The memory managers 26, 28, and 30 may operate separately from the drivers or be incorporated into the drivers. In the embodiment shown, a separate memory manager 26, 28, and 30 is provided for each level, layer, or type of memory 14, 18, 20 used for caching bricks. There is one memory manager 26, 28, 30 for each memory pool 14, 18, 20. For example, if a system is installed with two graphics boards, then there may be two graphics memory managers, one for each graphics board. In other embodiments, one or more of the memory managers 26, 28, 30 are combined or unified. Only one memory manager 26 may be provided for two or more memories 14, 18, 20.

Referring again to FIG. 1, the processor 16 is a central processing unit, control processor, application specific integrated circuit, general processor, field programmable gate array, analog circuit, digital circuit, combinations thereof, or other now known or later developed device for operating the memory managers 26, 28, 30 (see FIG. 2). The processor 16 is a single device or multiple devices operating in serial, parallel, or separately. The processor 16 may be a main processor of a computer, such as a laptop or desktop computer, may be a processor for handling some tasks in a larger system, such as in an imaging system, or may be a processor designed specifically for memory management.

The processor 16 is operable to manage storage of volume data partitioned into subsets. The processor 16 runs software or includes hardware for implementing the memory managers 26, 28, 30 for each different physical memory layer (see FIG. 2). The processor 16 interfaces between the memory drivers and the volume rendering. Where the dataset has more data than memory space available in the GPU memory 14, the data set is divided into bricks. The processor 16 manages storage of these subsets in different physical memory layers in order to optimize volume rendering. Rather than random or mere storage as needed, the processor 16 uses information for the volume rendering to determine where a brick is to be stored, which brick to overwrite, or when to transfer a brick.

During an initial or subsequent volume rendering from a dataset, the volume rendering application requests a brick or subset of data. The volume rendering application is run by the GPU 12, the processor 16, and/or another device. The requested brick may not have been previously stored or cached. The memory manager 26, 28, 30 caches a set of bricks and responds to queries by checking whether a brick is in the cache using a brick key or other identifier. Alternatively, the previous storage or cache may be in a suboptimal memory 18, 20, so transfer to another memory 14, 18 is desired. In other situations, the requested brick is available after having been previously cached in an optimal memory level.

In response to a request for the brick, the processor 16 checks the memory budget of a memory 14, 18, 20. For example, the processor 16 checks the memory budget of the GPU memory 14 first since rendering is most efficiently performed from data in the GPU memory 14. The size of the subset is compared against remaining available memory space. Each memory manager 26, 28, 30 is initialized with a budget number. The total size of memory allocated below the budget number is monitored. For any uncached bricks that are requested, the manager fulfills the memory requirement either by utilizing unused memory to cache the brick, or by replacing cached bricks.

A portion of the memory budget may be allocated for transferring bricks and/or for other imaging or texture information. In additional to bricks, which usually are 3D luminance (e.g., black and white) textures, the memory manager 26, 28, 30 may also support other memory requests, such as 2D textures (e.g., 2D image and/or cut-planes), color textures (RGB and/or opacity values), and pixel buffers (e.g., frame buffer or 2D array). The content of these buffers varies depending on the implementation of the supported volume rendering technique, and may include data that has been swizzled (e.g., rearranged linear data), compressed, or have multiple levels of resolution.

The memory manager 26, 28, 30 may include built-in exception handling to handle out-of-memory conditions, so the budget number can be specified aggressively. The memory budget may be set to include most, all, or even greater than the actual physical memory. Maximizing the budget may allow caching of as many bricks as possible without causing malfunction. For example, the budget is set at or just below the available memory space. In this way, computationally or temporally expensive data transfers between memory levels are reduced to a minimum, hence achieving better performance. The memory used as a cache is composed of a hierarchy of cache levels, were each level in the hierarchy represents a memory buffer that can be accessed faster than the previous level. Usually the size of slower levels is larger, and it gets smaller in faster cache levels. Data that has higher priority is moved in the faster levels, while lower priority data is stored in slower levels. For example, the GPU 12 uses bricks in the GPU memory 14, either cached or not, for rapid rendering. Non-cached bricks are transferred to the GPU memory 14 from slower memory levels, such as the system memory.

For replacement of cached bricks, a priority is used to identify bricks to be overwritten or replaced. Higher priority bricks are more likely stored in the most efficient memory, such as the GPU memory 14. A priority number is assigned for each stored subset. For an initial rendering, the priority may be assigned based on the current view direction, a transfer function (e.g., opacity or color function), location represented by data of the brick, rendering function being used, and/or other rendering factors indicating a likelihood the data of the brick will contribute to the rendered image. For example, data for a brick associated with spatial locations behind highly opaque data given a viewing direction is unlikely to be used for rendering. Data not used is given a lowest priority. Data to be used definitely is given a highest priority. Data that only may contribute or that contributes little may be given a lesser priority. The priority may reflect the possibility of usage for a following rendering. Each brick may treated as a single entity. So long as the brick is needed, no matter how small the contribution, the brick is assigned a high priority number. In alternative embodiments, the size of the contribution may contribute to the priority.

In one embodiment, the priority is a range of numbers between 0.0 and 1.0. Five levels of priority are used, with 0.0 being a least priority. In an initial rendering or initial priority assignment for each cached brick, two of the five levels are used (e.g., 0.5 and 1.0). Other ranges, number of levels, and/or number of levels used for initial assignment may be used.

As the initial rendering continues or during subsequent renderings, bricks may be replaced based on priority. The priorities of bricks in different cache levels are independent. In one embodiment, the priority of an important brick (critical in response time) is set to 1, no matter where cached (graphics, intermediate, or system memory). Similarly, a less important brick is assigned a priority of 0.5, regardless of the cache level. The priority of a brick to be loaded (e.g., likely 1) is compared with a lowest priority of a brick with a same or sufficient size for possible replacement. If the lowest priority is lower than the priority of the brick to be cached, the lower priority brick is overwritten. For example, one subset is overwritten with a non-stored subset as a function of the priorities. The manager replaces the least important bricks using the priority assignment.

Since rendering parameters change, the priorities of previously cached bricks may be updated. The update occurs multiple times during a single rendering, once at the end of each rendering, or at another frequency or time.

The priority is updated as a function of the volume rendering. The priority associated with each subset is updated based on use and/or other rendering parameters (e.g., view direction of the volume rendering, transfer function of the volume rendering, voxel values of other bricks for the volume rendering, or combinations thereof). For each cached brick, the assigned priority is dynamically updated according to the importance of the brick for volume rendering based on past or expected use. For example, the priority is decreased where the brick was not used in a most recent rendering or where the brick may not be used given the current rendering parameters. Any amount of decrease may be used, such as one or more levels of decrease. Any function may be used, such as requiring one, multiple or specific combinations of factors for a given amount of priority decrease.

The system memory 20, GPU memory, and/or another memory stores instructions for operating the processor 16 and/or the GPU 12. The instructions are for managing volume rendering memory. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system.

In the method below, pseudo code (i.e., code that demonstrates the principle but may not compile) examples are provided in C++ to illustrate the design and functionality of the memory managers. For operational code, specific programming for a particular system may be added. Other programming languages and/or hardware may be used. Other programs, software organization, approaches, or instructions may be used.

Figure 3:
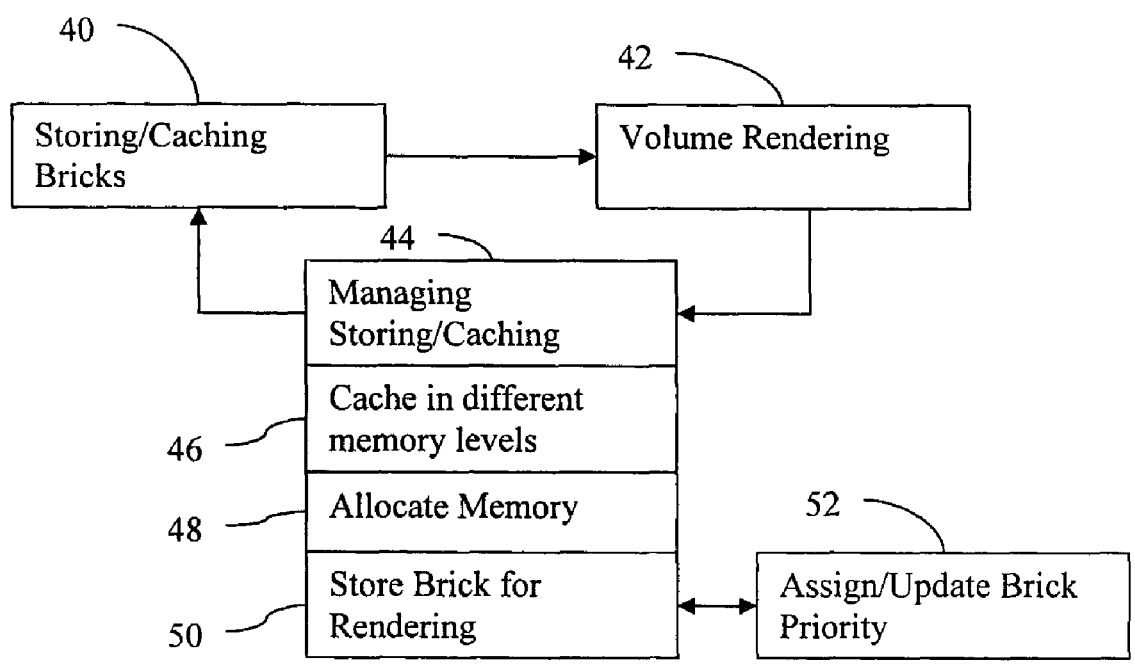
FIG. 3 is a flow chart diagram of one embodiments of a method for managing volume rendering memory.

FIG. 3 shows a method for managing volume rendering memory. The method is implemented by the system 10 of FIG. 1 in the arrangement of FIG. 2, or other systems and/or arrangements. The method is performed in the order shown or other orders.

In act 40, a dataset is stored as bricks. The dataset is partitioned into sub-volumes and cached. The sub-volumes may represent linear, planar, or volume arrangements. For example, cubic sub-volumes of voxels in 64×64×64 arrangements are separated for storage. Tens, hundreds, or thousands of such sub-volumes may be used for a single dataset. The bricks may have the same or different sizes.

Subsets of data representing a volume are cached in different physical memory levels. A priority is assigned to each brick. The priority is based on the rendering parameters, and/or values of the subset. Subsets with higher priority are stored in the most efficient memory, such as a GPU memory. Other subsets are stored in other memory levels once the most efficient memory budget is allocated. Subsets to be stored once one memory level is full either replace a previously stored subset or are stored elsewhere. The replaced subset is either no longer stored or is transferred to a different memory level. Some of the bricks may not be cached. The bricks are stored as needed during rendering. Alternatively, all the bricks are stored initially.

In act 42, volume rendering is performed. The volume rendering occurs during or after caching in act 40. The volume rendering uses some or all of the cached subsets. Depending on the memory in which a subset is cached, the rendering may be more or less rapid. Some memories may have slower response. The subsets are transferred to the rendering application, so slower memory transfer speeds may slow the rendering. The rendering application is an API or other application operating with an API or for rendering.

Any now known or later developed volume rendering may be used. For example, projection or surface rendering is used. In projection rendering, alpha blending, average, minimum, maximum, or other functions may provide data for the rendered image along each of a plurality of ray lines or projections through the volume. Different parameters may be used for rendering. For example, the view direction determines the perspective relative to the volume for rendering. Diverging or parallel ray lines may be used for projection. The transfer function for converting luminance or other data into display values may vary depending on the type or desired qualities of the rendering. Masking and/or clipping may determine data to be used for rendering. Segmentation may determine a portion of the volume to be rendered. Opacity settings may determine the relative contribution of data. Other rendering parameters, such as shading or light sourcing, may alter relative contribution of one datum to other data. The rendering uses the data representing a three-dimensional volume to generate a two-dimensional representation of the volume.

For efficient rendering, the storage of bricks is managed in act 44. A brick cache manager controls the storage as a function of the volume rendering. A feedback from the volume rendering act 42 provides previous usage information, and/or current rendering parameters. Previous usage may be based on memory monitoring given feedback indicating different renderings. Based on previous rendering settings, some data may or may not have been used. Assuming current settings to be similar, the previous usage may be an indication of expected usage for a current rendering. Current rendering parameters may also indicate expected usage. The managers interface between the memory drivers for the different memory levels and the volume rendering application. The interface allows for caching bricks based on rendering, whether previous usage or current rendering parameters. Rather than managing brick caching based only on requests from the rendering application, further rendering information is used to control storage.

Each memory manager maintains a set of one or more cached bricks. Every brick is associated with a unique key. The key is provided to the volume rendering application or information from the volume renderer may be associated with each particular brick. The volume rendering application queries a memory manager with a brick key or other identifier to check whether the brick is fully or partially cached in the memory pool. The response to such a query should as quick as possible. In one embodiment, the bricks in a given memory pool are indexed with a hash or look-up table so that constant query time is provided. Alternatively, the memory pool is searched to identify the brick storage location. In other embodiments, a single table is used for all memory pools.

In act 46, management of the caching in act 44 includes caching the bricks in different physical memory layers. The physical memory layers are separated by device, continuous addressing, or other division. The caching of each of the different physical memory levels is managed separately or in combination. Separate memory managers may be the same or different, depending on the memory and driver with which the manager interfaces.

In one example embodiment, data members of memory managers are based on a template program. One possible example is:

```
template<class BrickCache>
class BrickMemoryManager
{
    typedef std::map<CacheMapKey, BrickCache> cacheMap;
    cacheMap mCacheMap;
    std::vector<BrickCache> mTransferBrick;
    int mBudget;
};
```

BrickCache represents a cached brick in any cache level and defines a memory or storage group. The CacheMapKey defines the content of the memory. In addition to the cache key, each brick is assigned to a volume in order to facilitate the handling of multiple volumes, or a series of volumes representing multi-resolutions of the same dataset. The volume is assigned as mVolume in the class BrickCache. CacheMap is the hash table. The mTransferBrick defines a memory array or space for transfers of bricks into and out of the memory. Each cached brick is also assigned a priority. mBudget defines the total memory space allocated to a given manager.

Each brick could be cached just partially. This information is stored in mLoadedSubVolRange in the example code below. The sub-volume range variable specifies the coordinates and size of a bounding box that encloses the cached portion.

```
class BrickCache
{
    CacheMapKey mCacheId;
    float mPriority;
    Volume* mVolume;
    Range mLoadedSubVolRange;
};
```

In this example, three types of memory managers are supported, each based off the template for BrickCache class. The three memory managers (e.g., BrickCache) may be generally defined MainMemBuffer (e.g., system memory), PBOBuffer (e.g., AGP memory), and Texture3d (e.g., GPU memory). In an example, the three types of memory manager are declared as:

```
class MainMemCache: public BrickMemoryManager<MainMemBuffer>
{...};
class ivtAgpMemCache: public BrickMemoryManager<PBOBuffer>
{...};
class GfxMemCache: public BrickMemoryManager<Texture3d>
{...};
```

Other memory managers may be defined. Different templates or individual coding may be used for different memory managers.

In act 48, management of the caching of act 44 includes allocating memory space. Each memory manager is initialized with a budget number. The memory manager keeps the total memory usage, including cached and transfer bricks, plus other memory objects, below the budget. By the memory manager handling exceptions, even if the specified budget is greater than the size of the physical memory, the memory manager may still perform properly. Specifying a smaller budget than available memory space may not take full advantage of the hardware, and may degrade performance. The budget is specified aggressively, such as at or just below the available memory space in one embodiment. Lesser or greater budgets relative to available memory space may be used.

The allocation is for bricks, transfer space, and/or non-brick data. For example, the memory space within a budget is allocated for a transfer array to transfer one or more bricks into or out of the memory, for non-brick data (e.g., 2D texture data), and for bricks to be possibly used for rendering.

In addition to cached bricks, each memory manager may maintain zero to multiple transfer bricks. A transfer trick is used when no more bricks can be cached, but accessing the corresponding subset (e.g., brick) requires the brick to be resident in memory. A transfer brick is not cached, so the content in the memory space for a transfer brick is updated before usage. For example, when rendering a brick, the brick is downloaded to texture memory, either as a cached texture object (e.g., cached brick) or just a temporary texture (e.g., transfer brick). For multiple transfer spaces, each space is handled in sequence and populated by the next requested unavailable brick. In some cases, using multiple transfer bricks improves performance, because data transfer stages are pipelined. The transfer bricks are indexed as an array, and the next transfer brick is picked in a round-robin fashion. Different numbers of transfer bricks may be used for the different memories. In one example, one transfer brick is used for texture memory, 32 transfer bricks are used for AGP memory, and one transfer brick is used for the system memory. These numbers may be different for different GPUs or other system considerations.

In addition to bricks, other memory requirements may be allocated in the budgeted memory space. For example, critical space is allocated to allow rendering. A renderer may need a 2D texture or a pbuffer for early ray termination. For such a critical memory requirement, the GPU memory manager tries to allocate memory for the buffer and discards cached bricks if this critical allocation fails. If all the cached bricks are freed and the allocation is still not successful, the manager may generate an exception to the caller. Another example of critical memory is the transfer bricks. If requested, the allocation of a transfer brick has to be successful, otherwise the rendering may not continue.

Below is the example code segment for allocating a texture not corresponding to a brick. Other critical or non-critical memory requests may be handled similarly.

```
void ivtGfxMemCache:: allocTexture ( )
{
    bool flag = FALSE;
    do
    {
        try
        {
            allocate memory for the texture;
            flag = TRUE;
        }
        catch(...)
        {
            if(!discardCache( ))
                throw exception;
        }
    }
    while(flag == FALSE);
}
```

Exceptions are handled by the memory manager. For example, the allocMemory( ) code above handles exceptions internally, particularly the out-of-memory exception. If memory allocation fails while the budget has not been reached (e.g., critical storage uses the available memory), the memory manager may already use too much memory. In such a case, the exception handling frees some cached bricks by deleting lower priority bricks, in addition to denying the caching the currently requested brick.

The code below is an example of this exception process.

```
bool BrickMemoryManager::allocMemory(brick, brickDim[3], datatype)
{
    try
    {
        brick.initialize(brickDim, datatype);
        return TRUE;
    }
    catch(...)
    {
        // Out of memory, release some
        discardCache(1.0f, textureSize);
        return FALSE;
    }
}
```

The brick to be stored is allocated within the budget if space is available (i.e., TRUE is returned). If out of memory, some bricks are discarded.

In act 50, the management of caching act 44 includes storing a brick for rendering. The identity of a requested brick is checked for previous storage. The volume rendering application, memory manager, or other application calls the memory manager, such as isBrickInCache( ) in the example code provided, to check whether the required subset is already loaded to memory. The memory manager detects whether there is a brick labeled with the appropriate identification. If so, the requested range of data (e.g., the brick or sub-brick boundary) is compared with the loaded or stored range. A TRUE or FALSE is returned for whether the requested information is already available. Example code for this process is:

```
bool BrickMemoryManager::isBrickInCache(CacheMapKey id, Range&
range)
{
    if (the brick is in cache)
    {
    BrickCache& brick = the cached brick;
    if (brick.mLoadedSubVolRange.encloses(range))
        return TRUE;
    }
    return FALSE;
}
```

If the requested voxels are all in memory, the application simply retrieves the cached brick.

If the requested brick or voxels are not already available, the requested brick or portion of the brick is cached. Where the memory budget is not exceeded, a brick requested for volume rendering is stored. Using a transfer brick allocation, the requested brick is transferred into the memory. In one example, the code cacheBrick( ) is called to attempt to load the brick into memory for current and future use.

```
bool BrickMemoryManager::cacheBrick(cacheKey, brickDim[3], datatype,
priority)
{
    BOOL32 flag = FALSE;
    if(still within budget)
    {
    if(allocMemory(newBrick, texDim, datatype))
    {
        flag = TRUE;
        mCacheMap[id] = newBrick;
    }
    }
    else
    {
    If there is enough bricks with lower priority
    {
        If there is lower-priority brick with the same size
        {
            Replace it with the new brick
            flag = TRUE;
        }
        else
        {
            Discard some cache;
            If(allocMemory(newBrick, texDim, datatype))
    {
                mCacheMap[id] = newBrick;
                flag = TRUE;
    }
        }
    }
    }
    return flag;
}
```

If the requested brick is within the budget, the new brick (i.e., requested brick) is cached.

Otherwise, the new brick replaces or overwrites a previously stored brick. If there is not enough memory to allocate new bricks, the memory manager checks whether there is a low priority brick that is exactly the same size as the brick being requested. If so, the manager simply updates the contents and key of the low priority brick to correspond to the new or requested brick. The lower priority brick in memory and key in the hash table are overwritten with the requested brick and key. This may avoid unnecessary memory deletion and allocation, reducing memory fragmentation. If a brick of the same size is not available, the brick is cached in a different memory, a transfer array is used, or a fault is issued. Alternatively, a lower priority brick with a larger size or multiple smaller bricks are replaced.

The priority of the requested brick is used to find cached bricks that can be replaced or deleted. High priority bricks are more likely to be cached than low priority bricks. Each memory manager maintains a priority histogram or other table of priorities. The size of memory taken by bricks of each priority level may also be stored and used to identify a brick to be replaced. With the help of the priority histogram, the memory manager can quickly tell whether there are enough low-priority bricks that can be replaced or deleted. If the cacheBrick( ) or other overwriting methods fails, the next transfer brick is returned and a fault issued.

For storing bricks for rendering in act 50, priorities are assigned and updated for bricks in act 52. Each stored brick is assigned a priority. The priority of each brick in the memory reflects the importance of the brick. Any priority scheme may be used. In one embodiment, the priority is assigned as two or more levels through a range of numbers, such as five levels in the range of [0.0, 1.0] where 1.0 is the highest priority. The higher the priority indicates a more expensive cost to performance if the brick is deleted from the cache. When the memory manager has to free some brick memory, bricks with the lowest priority are replaced.

Initial priority is assigned based on expected use. For example, a brick is initially cached since the brick is to be used for rendering. The request itself indicates a higher priority. The size of the brick, likely amount of data to be contributed to the rendering, interactivity requirement of the brick, or other factors are used to set the priority of each brick when initially stored. In one embodiment, all levels of priority except the lowest are available for any brick to be initially stored. In another embodiment, only one or other subset of levels is available, such as 0.5 or 1.0 in the five level example.

After initial caching, the priority level of the stored bricks is updated. The priority is updated as a function of the volume rendering to be performed or during the volume rendering. For example, the priority associated with each brick is updated as a function of: use by the volume rendering, view direction of the volume rendering, transfer function of the volume rendering, voxel values of other bricks for the volume rendering, other rendering parameters, or combinations thereof. If a brick is expected not to be used for the current rendering, the priority for that brick is reduced. Otherwise, the priority is maintained or reset to the original value. Resetting rather than maintaining may avoid errors or undesired replacement where the priority may have been reduced during a previous rendering when the memory manager is supporting multiple volumes or multiple renderers simultaneously or in an interleaved fashion. In such cases, resetting may avoid removing the brick from cache.

Some usage information is only available during the rendering rather than before the rendering. For example, the renderer may determine that a brick is completely occluded if it is surrounded or blocked by fully opaque bricks. The occluded brick is not needed for the remainder of the rendering. In such a case, the brick priority is reduced during the rendering. Even if a brick is known not-to-be-requested for the current rendering, the memory manager may merely reduce the priority at this stage. The actual memory freeing or replacing is done lazily or on-demand, since the visibility of a brick may change due to changes in the opacity transfer function. Alternatively, the brick is removed once a particular priority is reached.

In one example, code for updating the priority is provided as:

```
void ivtBrickMemoryManager::updatePriorityInfo( )
{
    for each brick in cache
    {
    If the brick does NOT belongs to the current volume
        Reduce priority;
    else if(empty brick or the brick is fully clipped)
        Reduce priority;
    else if the brick is not used in rendering the previous frame
        Reduce priority
    else // the brick is expected to be used for this frame
refresh its priority to its initial value (1.0 for high priority brick and 0.5 for normal brick)
    }
}
```

In the cacheBrick( ) code example or using other code, requested but not stored bricks with a higher priority replace lower priority bricks. Subsets of the volume being rendered are stored as a function of priority in the different memory levels. By selecting stored bricks to be replaced based on priority, bricks less likely to be used in rendering are overwritten.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. In a non-transitory computer readable storage medium having stored therein data representing instructions executable by a programmed processor for managing volume rendering memory, the storage medium comprising instructions for:
   volume rendering from a data set representing a three-dimensional volume;
   storing the data set as bricks, at least some of the bricks stored in a graphics processor unit (GPU) memory; and
   managing, as a function of the volume rendering, the storage of the bricks with a brick cache manager;
   wherein managing comprises assigning a priority number for each stored brick; and updating the priority as a function of the volume rendering during the volume rendering, which of the bricks staying in storage in the GPU memory being a function of a comparison of priority numbers of a brick to be loaded and a stored brick, for the stored brick with a same or lower priority number than the brick to be loaded, the determination whether to keep the stored brick in storage being a function of relative sizes of the brick to be loaded and the stored brick, the sizes being an amount of memory space for the bricks.

2. The non-transitory computer readable storage medium of claim 1 wherein storing the data set as bricks comprises partitioning the data set in to sub-volumes, each sub-volume comprising one of the bricks.

3. The non-transitory computer readable storage medium of claim 1 wherein managing comprises caching the bricks in different physical memory layers, and wherein the brick cache manager comprises a plurality of memory managers for respective different physical memory layers.

4. The non-transitory computer readable storage medium of claim 1 wherein storing comprises storing with a driver, and wherein managing comprises interfacing between the driver and a volume rendering application.

5. The non-transitory computer readable storage medium of claim 1 wherein managing comprises storing a brick requested for volume rendering where a memory budget is not exceeded.

6. The non-transitory computer readable storage medium of claim 1 wherein managing and storing comprises:
   selecting a stored brick of the bricks as a function of the priority for the stored brick relative to priorities for other stored bricks; and
   overwriting the selected stored brick with a new brick.

7. The non-transitory computer readable storage medium of claim 1 wherein managing comprises:
   checking for previous storage of a first brick; and
   causing storage, with a transfer brick memory allocation, of the first brick if not previously stored.

8. The non-transitory computer readable storage medium of claim 1 wherein managing comprises allocating memory space for transfer of bricks and non-brick data.

9. The non-transitory computer readable storage medium of claim 1 wherein managing comprises:
   updating a priority associated with each brick as a function of: use by the volume rendering, view direction of the volume rendering, transfer function of the volume rendering, voxel values of other bricks for the volume rendering, or combinations thereof.

10. A system for managing volume rendering memory, the system comprising:
   a graphics processing unit operable for volume rendering;
   a memory responsive to a memory driver; and
   a processor operable to manage storage of volume data partitioned into subsets for a rendering application rendering an image, the processor interfacing between the memory driver and the volume rendering such that, for a memory budget allocated to data comprising caching bricks, cached bricks are discarded for another memory requirement during operation of the rendering application to render the image, the other memory requirement being other than for a brick to be cached, and an exception is generated where allocation of the other memory requirement within the memory budget is not successful;
   wherein the processor is operable to manage by assigning a priority number for each cached brick; and updating the priority as a function of the volume rendering during the volume rendering, which of the cached bricks staying in storage in the memory being a function of a comparison of priority numbers of a brick to be loaded and a stored brick, for the stored brick with a same or lower priority number than the brick to be loaded, the determination whether to keep the stored brick in storage being a function of relative sizes of the brick to be loaded and the stored brick, the sizes being an amount of memory space for the bricks.

11. The system of claim 10 wherein the memory is a memory of the graphics processing unit and the discard occurs in the memory of the graphics processing unit, and wherein the processor is operable to manage storage of the subsets in different physical memory layers, each different physical memory layer associated with a respective memory manager operated by the processor.

12. The system of claim 11 wherein the different physical memory layers comprise the memory of the graphics processing unit, a system memory, and an intermediate memory, the system memory comprising a cache memory of the processor.

13. The system of claim 10 wherein the processor is operable to check a memory budget for a requested subset requested by the graphics processing unit, the requested subset not previously stored in the memory.

14. The system of claim 10 wherein the processor is operable to assign a priority number for each stored subset, and operable to update the priority as a function of the volume rendering.

15. The system of claim 10 wherein the processor is operable to allocate memory space for transfer of subsets and non-subset data.

16. The system of claim 10 wherein the processor is operable to update the priority associated with each subset as a function of: use by the volume rendering, view direction of the volume rendering, transfer function of the volume rendering, voxel values of other bricks for the volume rendering, or combinations thereof, and operable to overwrite the stored brick with the brick to be loaded as a function of the priorities.

17. A method for managing volume rendering memory, the method comprising:
    caching subsets of data representing a volume in different physical memory levels of cache memory, each of the different physical memory levels having space allocated for transfer bricks and for cache bricks, the transfer bricks being temporary textures and not being cached for usage in volume rendering an image; and
    managing the caching of the subsets in each of the different physical memory levels and between the transfer brick and cache brick spaces of each level;
    wherein managing comprises assigning a priority number for each cached brick; and updating the priority as a function of the volume rendering during the volume rendering, which of the cached bricks staying in storage in at least one of the different physical memory levels being a function of a comparison of priority numbers of a brick to be loaded and a first cache brick, for the first cache brick with a same or lower priority number than the brick to be loaded, the determination whether to keep the first cache brick in storage being a function of relative sizes of the brick to be loaded and the first cache brick, the sizes being an amount of memory space for the first cache brick and brick to be loaded.

18. The method of claim 17 wherein managing the caching comprises storing subsets as a function of priority in the different physical memory levels, the different physical memory levels comprising first, second and third memory levels such that the priority is used for writing cache bricks into at least the first and second memory levels.

19. The method of claim 17 wherein managing comprises interfacing between a volume rendering application and memory drivers for the different physical memory levels.

20. The method of claim 17 wherein the different physical memory levels comprise the memory of the graphics processing unit, a system memory, and an accelerated graphics port memory, the system memory comprising a cache memory of the processor.

21. The method of claim 17 wherein managing comprises checking a memory budget for a requested subset, the requested subset not previously cached in a graphics processing unit memory, the graphics processing unit memory being one of the different physical memory levels.

22. The method of claim 17 further comprising:
    volume rendering from at least the subsets.

23. The method of claim 17 wherein managing comprises allocating memory space for transfer of subsets and non-subset data.

24. The method of claim 17 wherein managing comprises updating the priority associated with each subset as a function of: use by the volume rendering, view direction of the volume rendering, transfer function of the volume rendering, voxel values of other bricks for the volume rendering, or combinations thereof, and overwriting the first cache brick with the brick to be loaded as a function of the priorities.

25. The non-transitory computer readable storage medium of claim 1 wherein updating the priority level comprises updating to one of more than two levels, the more than two levels being a range of discrete numbers different than a single characteristic of the bricks, which of the discrete numbers assigned for updating the priority level being based on multiple variables.

* * * * *